United States Patent [19]

Petersen

[11] E Patent Number: Re. 33,085

[45] Reissued Date of Patent: Oct. 10, 1989

[54] PRECLEANER

[76] Inventor: Ross K. Petersen, 449 Wildwood La., Burleson, Tex. 76028

[21] Appl. No.: 193,238

[22] Filed: May 11, 1988

Related U.S. Patent Documents

Reissue of:

[64] Patent No.: 4,201,557
Issued: May 6, 1980
Appl. No.: 954,226
Filed: Oct. 24, 1978

U.S. Applications:

[63] Continuation of Ser. No. 22,217, Mar. 5, 1987, abandoned, which is a continuation of Ser. No. 749,731, Dec. 13, 1976, abandoned, which is a continuation-in-part of Ser. No. 648,531, Jan. 12, 1976, abandoned.

[51] Int. Cl.[4] ..... B01D 50/00

[52] U.S. Cl. ..... 55/327; 55/337; 55/430; 55/450; 55/457

[58] Field of Search ..... 55/327, 337, 430, 450, 55/457, 498, 504, 510

[56] References Cited

U.S. PATENT DOCUMENTS

| | | | |
|---|---|---|---|
| 1,031,862 | 7/1912 | Morse . | |
| 1,165,401 | 12/1915 | Fender . | |
| 1,281,238 | 10/1918 | Wegner | 55/430 |
| 1,434,562 | 11/1922 | Quam | 55/391 X |
| 1,438,553 | 12/1922 | Quam | 55/391 X |
| 1,530,825 | 3/1925 | Grimes | 55/404 |
| 1,703,867 | 3/1929 | Bursely . | |
| 1,743,522 | 1/1930 | Bull . | |
| 1,752,081 | 3/1930 | Heinss, Sr. | 55/408 |
| 1,843,091 | 1/1932 | Bull . | |
| 1,866,663 | 7/1932 | Morris | 55/457 |
| 1,870,216 | 8/1932 | Baldwin . | |
| 1,871,384 | 8/1932 | Miller . | |
| 1,931,193 | 10/1933 | Hawley | 55/396 |
| 1,934,311 | 11/1933 | Kegerreis et al. . | |
| 2,153,270 | 4/1939 | Osgood . | |
| 2,331,786 | 10/1943 | Lincoln | 55/397 |
| 2,378,506 | 6/1945 | Sebok . | |
| 2,403,830 | 7/1946 | Schneible | 55/408 X |
| 2,441,631 | 5/1948 | Hills | 55/396 |
| 2,448,048 | 8/1948 | Porter . | |
| 2,480,243 | 8/1949 | Hoadley | 55/457 |
| 2,626,013 | 1/1953 | Reimann | 55/337 |
| 3,273,324 | 9/1966 | Jennings | 55/404 |
| 3,362,155 | 1/1968 | Driscoll | 55/457 |
| 3,444,672 | 5/1969 | Alsobrooks | 55/404 X |
| 3,552,102 | 1/1971 | Araki . | |
| 3,670,480 | 6/1972 | Petersen | 55/430 |
| 3,675,401 | 7/1972 | Cordes . | |
| 3,678,664 | 7/1972 | Rubinstein et al. . | |
| 3,696,591 | 10/1972 | Bennett et al. | 55/337 |
| 3,791,112 | 2/1974 | Lidstone . | |
| 3,834,126 | 9/1974 | DiMinno, Jr. | 55/327 X |
| 3,850,189 | 11/1974 | Follett | 55/DIG. 6 |
| 3,895,930 | 7/1975 | Campolong . | |
| 3,973,937 | 8/1976 | Petersen | 55/449 |
| 4,013,137 | 3/1977 | Petersen | 180/69 |
| 4,197,102 | 4/1980 | Decker . | |

FOREIGN PATENT DOCUMENTS

| | | | |
|---|---|---|---|
| 537557 | 11/1931 | Fed. Rep. of Germany . | |
| 541840 | 8/1922 | France | 55/391 |
| 2127416 | 10/1972 | France . | |
| 284599 | 4/1931 | Italy . | |
| 483058 | 8/1954 | Italy . | |
| 642496 | 9/1950 | United Kingdom | 55/470 |
| 650815 | 3/1951 | United Kingdom | 55/408 |
| 4227 | 3/1988 | United Kingdom | 55/430 |

OTHER PUBLICATIONS

"Turbo Precleaner Parts Price List", Jul. 1, 1973, Medalie Manufacturing Co., Minneapolis, MN.

*Primary Examiner*—Bernard Nozick
*Attorney, Agent, or Firm*—Fay, Sharpe, Beall, Fagan, Minnich & McKee

[57] ABSTRACT

An apparatus for separating particulate matter entrained in a gas, as air, from the gas. The apparatus has a housing surrounding a separation chamber. A vane assembly carrying a cylindrical bowl is secured to an upper portion of the housing. The vane assembly has a plurality of circumferentially spaced inclined vanes providing air inlet passages open to the separation chamber for directing the gas and particulates entrained in the gas in a circular motion in the separation chamber. A stack mounted on the bowl forms an annular chamber above the vanes in communication with the inlet of the passages formed by the vanes. An open mesh screen surrounds the annular chamber. An impeller assembly located in the lower portion of the separation chamber has a plurality of arms carrying paddles. The paddles are located in an annular discharge or exit chamber in communication with the lower portion of the separation chamber. A plurality of downwardly open exit or discharge outlet openings are in communication with the exit chamber. Circumferentially extended blades separate the exit chamber from the exit openings. The impeller assembly has centrally located propeller means located in the clean air outlet. As the clean air moves in a spiral direction through the clean air outlet, it causes the propeller means to rotate and thereby turn the impeller assembly. The rotating paddles pump gas and particulates from the discharge or exit chamber through the exit openings into the outside environment.

49 Claims, 13 Drawing Sheets

FIG. 3
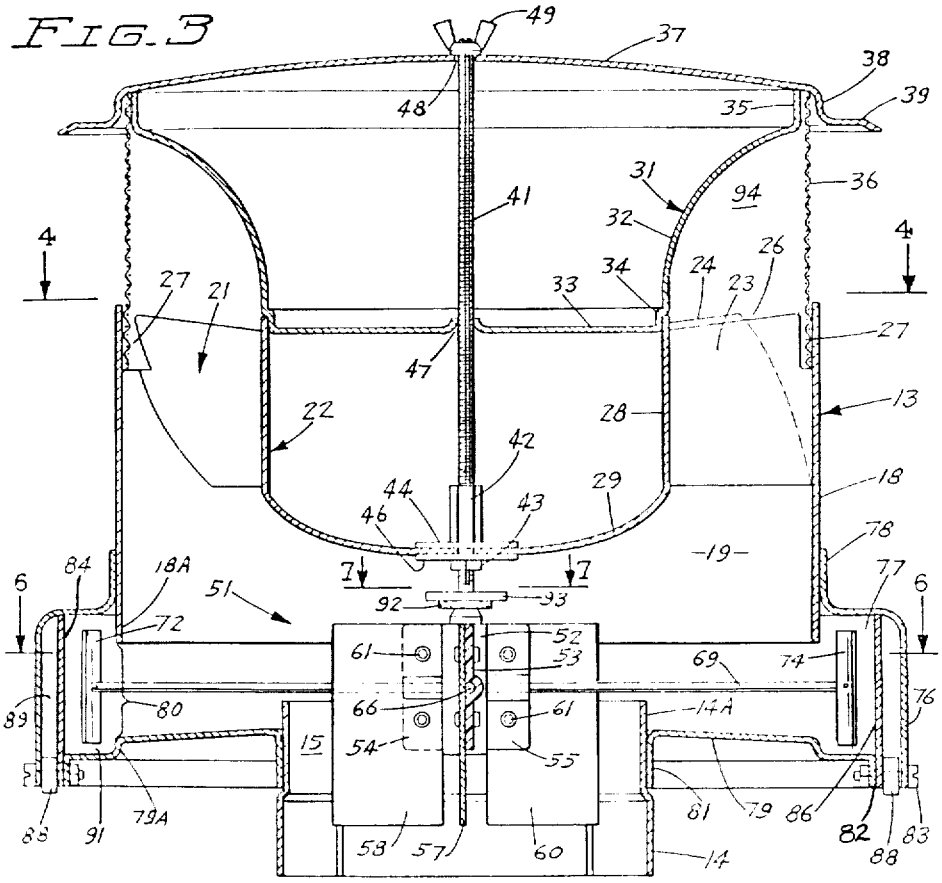
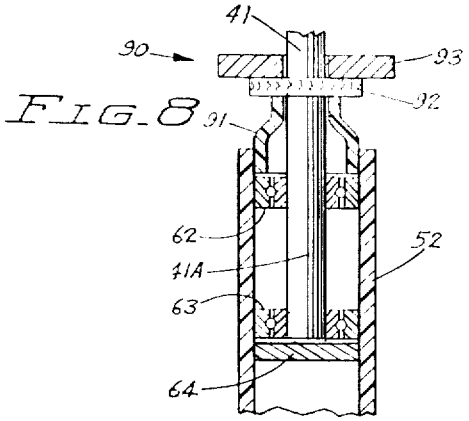
FIG. 8
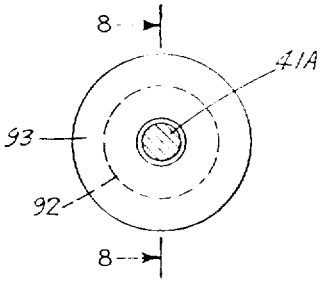
FIG. 7

149
II
137
100
138
139
136
113
118
178
176
183
183
183
182
119
II

184 A
189
188
185
100
176
184
189
157
189
185 A
188
115
160
188
183
152
183
158
159
182
119
189
187 A
186
179
187
189
186 A

PRECLEANER

Matter enclosed in heavy brackets [ ] appears in the original patent but forms no part of this reissue specification; matter printed in italics indicates the additions made by reissue.

CROSS REFERENCE TO RELATED APPLICATION

*This is a continuation of co-pending application Ser. No. 022,217 filed on Mar. 5, 1987, now abandoned.*

This application is continuation of U.S. Pat. Application Ser. No. 749,731 filed Dec. 13, 1976, abandoned. Application Ser. No. 749,731 is a continuation-in-part of U.S. application Ser. No. 648,531 filed Jan. 12, 1976, now abandoned.

BACKGROUND OF INVENTION

Air precleaners are used for removing particulates from the air prior to moving the air through an air cleaner connected to a carburetor or air intake structure of an internal combustion engine. Petersen in U.S. Pat. No. 3,670,480 discloses an air precleaner having a rotatable impeller or spinner operable to separate particles from air, discharge air and particles circumferentially from a housing, and direct clean air to the air intake structure of an engine. The clean air moves centrally through a stack to an engine in response to a vacuum pressure on the air moving to the engine. This precleaner has an air inlet vane assembly located in the bottom of the housing for directing air upwardly in a circular path into a centrifugal separation chamber. The air flows upwardly and then turns downwardly into the centrally located clean air exit opening. The impeller is used to pump air and particulate matter out through side discharge openings. While this device is operative, it does not take full advantage of the power of the vortex-like air flow in the mouth region of the clean air outlet passage.

Air cleaning devices having propeller blades located in air flow passages for turning a rotor having vanes have been proposed to separate dirt from air. Examples of this type of device are disclosed by Quam in U.S. Pat. No. 1,434,562 and No. 1,438,553 in U.S. Pat. No. 1,530,825. The vanes move the incoming air in a circumferential direction to a separating chamber where the dirt particles are subjected to centrifugal force which moves them outwardly. The outside strata of air and dirt is pumped by the moving vanes out of the bottom of the separation chamber. The vanes must be in the separation chamber to provide the necessary circumferential motion to the air.

SUMMARY OF INVENTION

The invention relates to an apparatus for separating particulate matter, as dirt, dust, snow and the like, from a carrier gas, as air. More specifically, the apparatus of the invention is used in conjunction with the air inlet to an internal combustion engine for separating airborne particles from the air prior to introduction of the air into the engine, such as the air cleaner and carburetor of the engine. The apparatus has a housing surrounding a separation chamber. A circumferentially positioned vane assembly delivers air in a swirling or circular flow pattern to the upper portion of the chamber. A bowl-shaped housing is mounted on the vane assembly. The bowl-shaped housing has an annular air inlet chamber located above the vane assembly. An annular screen surrounds the bowl to separate the annular intake chamber from the surrounding environment. An impeller or spinner assembly is located in the separation chamber. The impeller assembly is rotatably mounted on a bearing supported from the bowl. The impeller assembly includes a plurality of propeller blades. The blades have major portions located in the clean air exit passage so that the vortex-like movement of the air in the passage spins the impeller. The impeller has a plurality of outwardly directed arms carrying pumping blades or paddles. The blades are located in an annular air and particle discharge or exit chamber. The discharge chamber is open to the lower portion of the separation chamber and a plurality of exit openings. Circumferentially disposed arcuate blade members separate the air exit chamber from the discharge or outlet openings.

An object of the invention is to provide an air precleaner operable to efficiently separate particulate matter, as dirt, dust, snow, ice and the like, from the air prior to its introduction into an internal combustion engine. Another object of the invention is to provide an apparatus for separating dirt and other foreign matter from a gas having vane structure for directing the gas in a circumferential direction to a separation chamber and impeller structure having pumping paddles located in a separate annular exit or discharge chamber positioned outwardly of the separation chamber to expel gas and dirt from the apparatus. A further object of the invention is to provide an air precleaner with an impeller assembly having propeller means located in the clean air passage so that the propeller means is driven by the vortex movement of the air flowing in the clean air passage. Yet another object of the invention is to provide an effective and efficient apparatus to separate dirt particles and the like from a gas that uses the flow of the gas through the apparatus to power an impeller pump and does not have external power requirements. Still another object of the invention is to provide an air precleaner with a removable cover and screen to facilitate servicing and cleaning of the precleaner. A still further object of the invention is to provide an air precleaner having a spinner with a bearing assembly that has a minimum of rotational friction and does not freeze up under adverse conditions. These and other objects and advantages of the invention are disclosed in the following description of the preferred embodiment of the invention and the drawings associated therewith.

IN THE DRAWINGS

FIG. 3 is an enlarged sectional view taken along line 3—3 of FIG. 1;

FIG. 7 is an enlarged sectional view taken along line 7—7 of FIG. 3;

FIG. 8 is a sectional view taken along line 8—8 of FIG. 7;

DESCRIPTION OF PREFERRED EMBODIMENT

Figure 1:
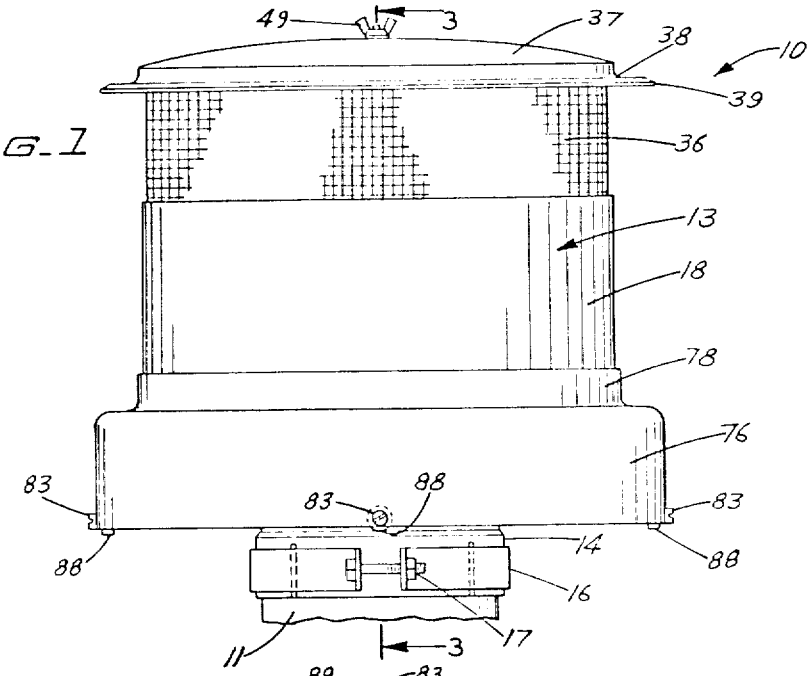
FIG. 1 is a side elevational view of a first modification of the air precleaner of the invention.

Referring to the drawings, there is shown in FIG. 1 the air precleaner of the invention indicated generally at 10 mounted on a low pressure air intake stack 11. Stack 11 is a tubular air intake pipe that is connected to an air cleaner mounted on or connected to the carburetor or air intake manifold of an internal combustion engine. An example of an air intake pipe and structure to mount the pipe on a vehicle having an internal combustion engine is shown in applicant's co-pending U.S. application Ser. No. 571,584 filed Apr. 25, 1975, now U.S. Pat. No. 4,013,137. Precleaner 10 is usable with internal combustion engines, such as those used in tractors, trucks, buses or the like, and stationary engines.

Intake stack 11 has a passage 12 for carrying air to a selected location, such as the air cleaner for a carburetor. Precleaner 10 is useful in other environments, machines, engines, burners, and the like to remove particulate matter from gas. The following disclosure is limited to the use of the precleaner 10 with an internal combustion engine for separating airborne particles, as dust, fibers, tailings, sand, snow, ice, and the like, from the air prior to passage of the air to the air cleaner and the carburetor of the engine. The removal of these particulates from the air prior to movement of the air to the air cleaner provides a more efficient and clean air cleaner, thus extending the life of the air cleaner, carburetor and the engine.

Figure 2:
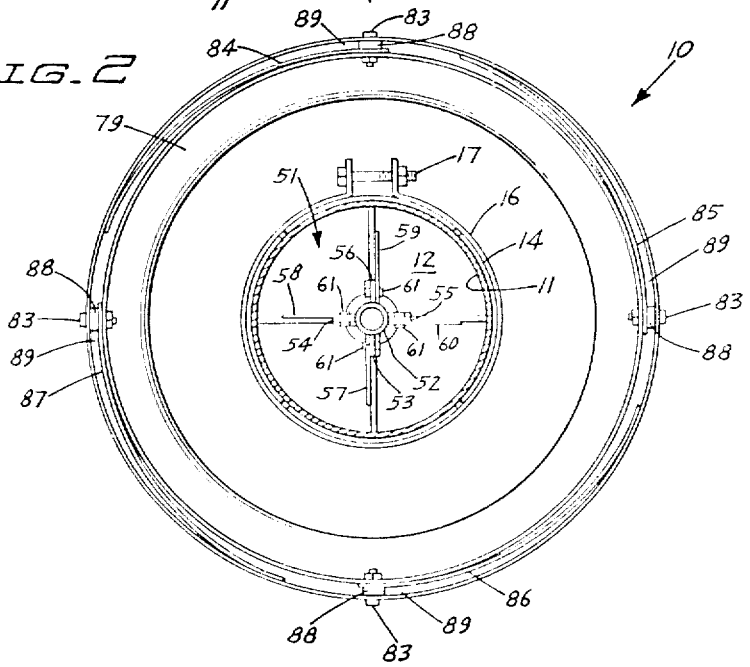
FIG. 2 is a bottom plan view of the air precleaner of FIG. 1.

Precleaner 10 has an upright tubular or cylindrical housing indicated generally at 13 mounted on stack 11. The housing 13 includes a downwardly directed cylindrical air or gas outlet sleeve 14 positioned over the top of stack 11. Sleeve 14 has an outlet passage 15 in axial alignment with passage 12 of stack 11. As shown in FIG. 1 and 2, a band clamp 16 located about sleeve 14 holds the sleeve in firm engagement with the stack 11. A nut and bolt assembly 17 cooperates with clamp 16 to releasably mount the clamp on sleeve 14.

Figure 4:
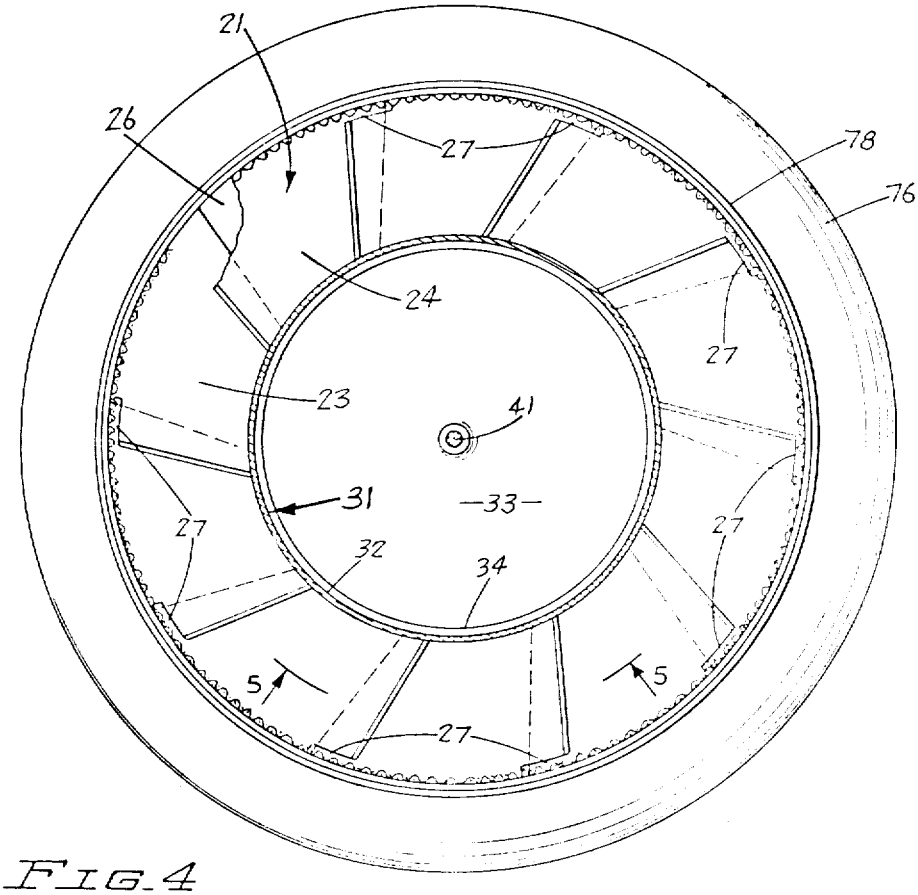
FIG. 4 is a sectional view taken along line 4—4 of FIG. 3.
Figure 5:
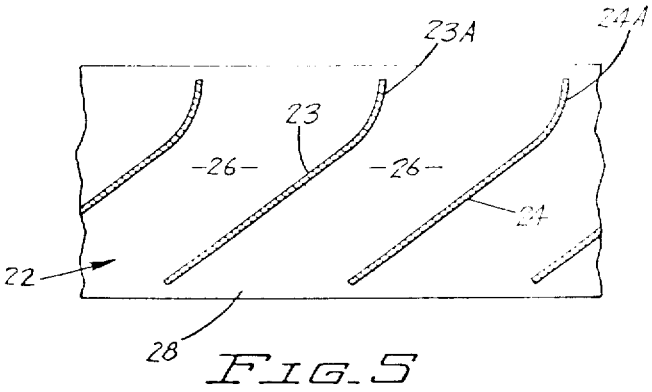
FIG. 5 is a sectional view taken along line 5—5 of FIG. 4.

Housing 13, as shown in FIG. 3, comprises an upright tube or cylindrical member 18 surrounding a particle separation chamber 19. A vane assembly indicated generally at 21 is located within the upper part of chamber 19. The outside of vane assembly 21 is secured by welds to the upper portion of tube or side wall 18 and the inside of vane assembly 21 is secured by welds to a centrally located bowl or center member indicated generally at 22. Vane assembly 21 comprises a plurality of pairs of vanes 23 and 24 extended circumferentially around bowl 22. As shown in FIG. 4, pairs of vanes 23 and 24 are spaced from each other by a passage 26 to provide for the flow of air into chamber 19. Vanes 23 and 24 are short arcuate segments which slope downwardly in a circumferential clockwise direction. The pairs of vanes 23 and 24 circumferentially overlap each other. In other words, upper part of vane 24 is above the lower part of vane 23. As shown in FIG. 5, the upper end section 23A of vane 23 curves upwardly in an axial direction. Vane 24 has a similar curved upper section 24A. The upper sections 23A and 24A of each of the pairs of vanes are spaced from the adjacent inside wall of tube 18 forming therewith a recess or cavity 27.

Returning to FIG. 3, bowl 22 has an upright cylindrical side wall 28. The pairs of vanes 23 and 24 are secured by welds or the like to the side wall 28. Side wall 28 is integral with a convex curved bottom wall 29. Bottom wall 29 curves downwardly from the vane assembly 21 and is located in the midsection of chamber 19.

A second bowl or velocity stack indicated generally at 31 is mounted on top of bowl 22. Bowl 31 has an annular concave curved side wall 32 joined to a flat circular bottom 33. Side wall 32 effectively forms an upper extension of center member wall 28. The outer peripheral edge of bottom 33 has an inwardly directed annular shoulder 34. Shoulder 34 forms an annular recess for accommodating the top edge of side wall 28. The shoulder 34 nests in a telescopic concentric relationship with side wall 28 and thereby centers and mounts the second bowl 31 on the first bowl 22. The top section of side wall 32 has an axially extended cylindrical annular flange 35. Flange 35 has an outside cylindrical wall engageable with a circular screen 36. Screen 36 is a wire mesh preferably having 4 wires per cm. Other size screens can be used. The lower section of screen 36 fits into the cavities 27 between the vanes 23 and 24 and the inside of tube 18.

A generally flat, dome-shaped cover 37 closes the top of bowl 31. Cover 37 has a downwardly directed annular lip 38 located around the outside of the upper portion of screen 36 and holds the screen around the flange 35. Lip 38 terminates in an outwardly directed annular flange 39. Flange 35, lip 38 and vanes 23 and 24 and tube 18 support the screen 36 on the housing 13. An axially extended rod 41 longitudinally extends through the bottom 29. Rod 41 is clamped to bottom 29 with an upper nut 42 and a lower nut 43. Washers 44 and 46 are located on opposite sides of the bottom 29 and are held in clamping engagement with bottom 29 by the nuts 42 and 43 respectively. Rod 41 extends upwardly from nut 42 through a hole 47 in bottom 33 and a hole 48 in cover 37. A wing nut 49 threaded on the upper end of rod 41 holds the cover 37 in firm engagement with the top annular edge of flange 35.

A rotatable impeller or spinner assembly indicated generally at 51 is located below housing member or tube 18 in the bottom part of chamber 19. Spinner assembly 51 has an upright cylindrical hub 52 having four outwardly directed linear ribs 53, 54, 55 and 56. The ribs 53–56 are circumferentially spaced 90° from each other and are attached to upright generally rectangular blades 57, 58, 59 and 60 respectively. Suitable fastening means 61, as a plurality of rivets, secure the blades to their respective ribs. The ribs and blades can be integral with the hub 52. For example, the hub, ribs and blades can be a one-piece plastic or other rigid member.

Referring to FIG. 8, hub 52 is a bearing assembly rotatably mounted on a downwardly directed portion 41A of rod 41. A pair of roller bearings 62 and 63 rotatably mount hub 52 on rod portion 41A. The lower end of the hub 52 carries a cap or plug 64 to protect the bearings 62 and 63 from foreign material.

Figure 6:
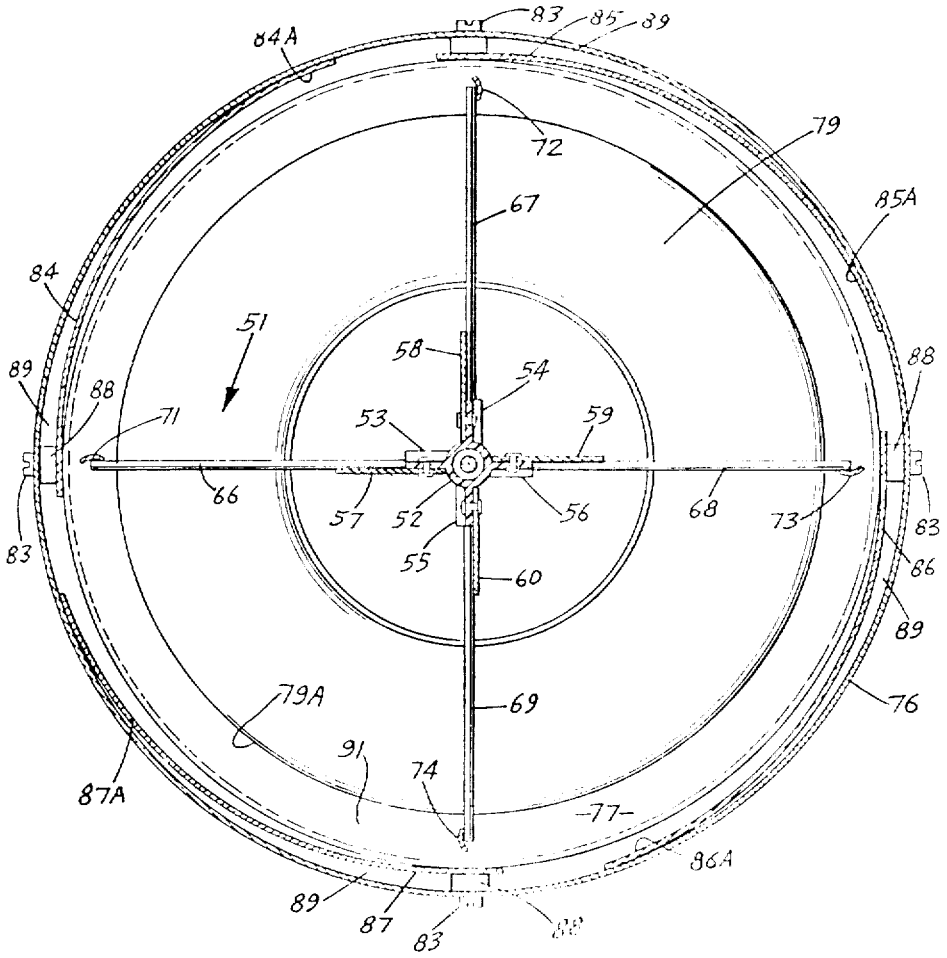
FIG. 6 is a sectional view taken along line 6—6 of FIG. 3.

Rods or arms 66, 67, 68 and 69 extend outwardly from the respective ribs 53, 54, 56 and 55. Secured to the outer end of each arm 66, 67, 68 and 69 are paddles or impellers 71, 72, 73 and 74 respectively. Each paddle is a blade-like member having a convex curved forward or leading face. The paddles 71–74 are surrounded by an annular skirt or sleeve 76 and are located in an annular exit or discharge chamber 77. Chamber 77 surrounds and is located outwardly of separation chamber 19. Skirt 76 has an upwardly directed cylindrical flange 78 secured by welds or the like to the lower portion of side wall 18. Skirt 76 is connected to the outlet sleeve 14 with a base or disc 79 providing a second or lower wall for chambers 19 and 77. Disc 79 has a downwardly directed inner annular flange 81 secured by welds or the like to outlet sleeve 14. The outer peripheral edge of disc 79 has downwardly directed outer annular flange 82 accommodating a plurality of nut and bolt assemblies 83 which attach the skirt 76 to disc 79. A plurality of separators or arcuate blades 84, 85, 86 and 87 are located in the chamber 77 between the outer ends of the paddles 71, 72, 73 and 74 and skirt 76. Blade 84 has an end 84A, as shown in FIG. 6., attached to the skirt 76. Blades 85, 86 and 87 have similar ends 85A, 86A and 87A attached to the skirt 76. The opposite or forward ends of the blades 84–87 are spaced inwardly from the skirt 76 with washers or spacers 88 surrounding the nut and bolt assemblies 83. As shown in FIGS. 2 and 6, the blades 84, 85, 86 and 87 are spaced from each other equal circumferential distances and form a plurality of arcuate discharge passages 89 leading to downwardly directed outlets between the skirt 76 and the outside flange 82 of base 79 as seen in FIGS. 3 and 6. The forward inlet portions or mouths of the passages 89 are upright and thereby define the entrances to elongated passages separated 90° from each other and are located radially outwardly from the paddles 71–74.

Tube 18 has a lower extension 18A that separates a portion of the chamber 19 from chamber 77. The base 79 has a downwardly directed shoulder 79A providing an annular bottom recess 91. The paddles 71, 72, 73 and 74 are located in an upright position generally parallel to the rotational axis of spinner assembly 51. Each of the paddles, being mounted at an outer end of arms 66, 67, 68 and 69, is located in the annular chamber 77. The lower ends of paddles 71–74 are located in recess 91. The upper ends of paddles 71–74 are located in the annular space radially outwardly of extension 18A. Chamber 77 is in communication with the chamber 19 via an annular opening or passage 80 and the discharge outlets 89 via the upright and elongated mouths of outlets 89.

The impeller blades 57, 58, 59 and 60 extend into the passage 15 formed by outlet sleeve 14. Outlet sleeve 14 has an upwardly directed top section 14A that extends above the top of base 79. More than one-half of the length of blades 57, 58, 59 and 60 are located in passage 15. The remaining or upper portions of the blades are located immediately above the mouth or top end of passage 15.

Referring to FIGS. 7 and 8, a bearing filter assembly indicated generally at 90 is located above hub 52. A cap 91 having an open upper end is mounted on the top of hub 52 and surrounds the rod 41A. An annular felt washer 92 surrounds the rod 41A and engages the top of cap 91. A metal washer 93 engages the top of the felt washer 92 and is freely located about the rod 41A. The metal washer 93 functions as a weight to hold the felt washer 92 in engagement with the top of cap 91. In operation, the rotation of spinner assembly 51 and vortex or circular motion of the air moving in passage 15 causes a vacuum pressure in the center portion of outlet passage 15. The air and fine particles entrained in the air will flow through bearings 62 and 63 under the influence of the vacuum pressure. The felt washer functions as a filter to minimize the amount of foreign material that can flow with the air into bearings 62 and 63. The weight 93 insures that the felt washer remains in an effective filtering location with respect to the top of the cap 91.

In use, the precleaner 10 is mounted on the intake stack 11 leading to the intake manifold or air intake structure of an internal combustion engine via the air cleaner and carburetor. The engine creates a suction force that draws the air through passage 12 of the stack. This causes the air to flow through the screen 36. The air enters an inlet opening or an annular chamber 94 surrounded by screen 36 adjacent the annular side wall 32 of the second bowl 31. The air flows through the passages 26 between the pairs of vanes 23 and 24. The angular inclination of vanes 23 and 24 causes the air to move or swirl in a circumferential direction as it is discharged into chamber 19. The circumferential movement of air and particles in chamber 19 causes the heavier particles to move outwardly toward the inside surface of tube 18. The air and particles move downwardly along the inside wall of tube 18 and flow outwardly over the bottom edge of the extension 18A into annular exit chamber 77. The air and particles move through an annular opening or passage 80 between the lower end of tube 18 and bottom wall 79. The cleaner air in the center of the chamber 19 moves into the outlet passage 15 of the outlet sleeve 14. The air moving through passage 15 rotates in a circumferential direction. The circumferentially moving air engages the blades 57, 58, 59 and 60 to thereby rotate the spinner assembly 51. The rotating spinner assembly 51 moves paddles 71, 72, 73 and 74 around annular chamber 77. This forces or pumps the air and particles in chamber 77 out to the atmosphere through the discharge passages or outlets 89. The pumping efficiency of paddles 71–74 is enhanced by having the annular chamber 77 larger than the width of passage 80. The stationary separating blades 84, 85, 86 and 87 guide the air outwardly and downwardly through the discharge outlets 89.

The air moving through the chamber 19 moves circumferentially and axially. A portion of the air with the heavier particles move axially outwardly and is discharged through the arcuate passages or outlet discharge openings 89. Another portion of the air moves inwardly to the outlet passage 15 where it engages blades 57, 58, 59 and 60 to thereby rotate spinner assembly 51. The relatively clean air moving through the passage 15 is in a circular or vortex-type flow. This flow provides sufficient speed of rotation of the paddles 71–74 so that they create a pumping force to move air from exit chamber 77 through the discharge outlets 89.

In the event the screen 36 needs cleaning or replacement, it can be removed. Wing nut 49 is removed from rod 41 and the cover 37 is separated from the bowl 31. Screen 36 can be axially moved from around bowl 31 so that both screen 36 and passage 94 can be cleaned.

Referring to FIGS. 9–14, there is shown a second modification of the air precleaner of the invention indicated generally at 100. Precleaner 100 can be mounted on an upright air intake stack. A stack carrying a precleaner is disclosed in applicant's co-pending U.S. application Ser. No. 571,584 filed Apr. 25, 1975, now U.S. Pat. No. 4,013,137.

Precleaner 100 has an upright or tubular housing indicated generally at 113 having a downwardly directed cylindrical outlet sleeve 114. Sleeve 114 is adapted to be connected to the outlet end of the stack. Sleeve 114 has a central outlet passage 115 for directing clean air into the stack. Housing 113, shown in FIG. 11, comprises an upright tube or cylindrical member 118 defining a particle separation chamber 119. A vane assembly, indicated generally at 121, is located within the upper part of chamber 119. The outside of vane assembly 121 is secured by welds or the like to the inside of tube 118. The inside portions of vane assembly 121 are secured by welds or the like to a centrally located bowl or center member indicated generally at 122.

Figure 12:
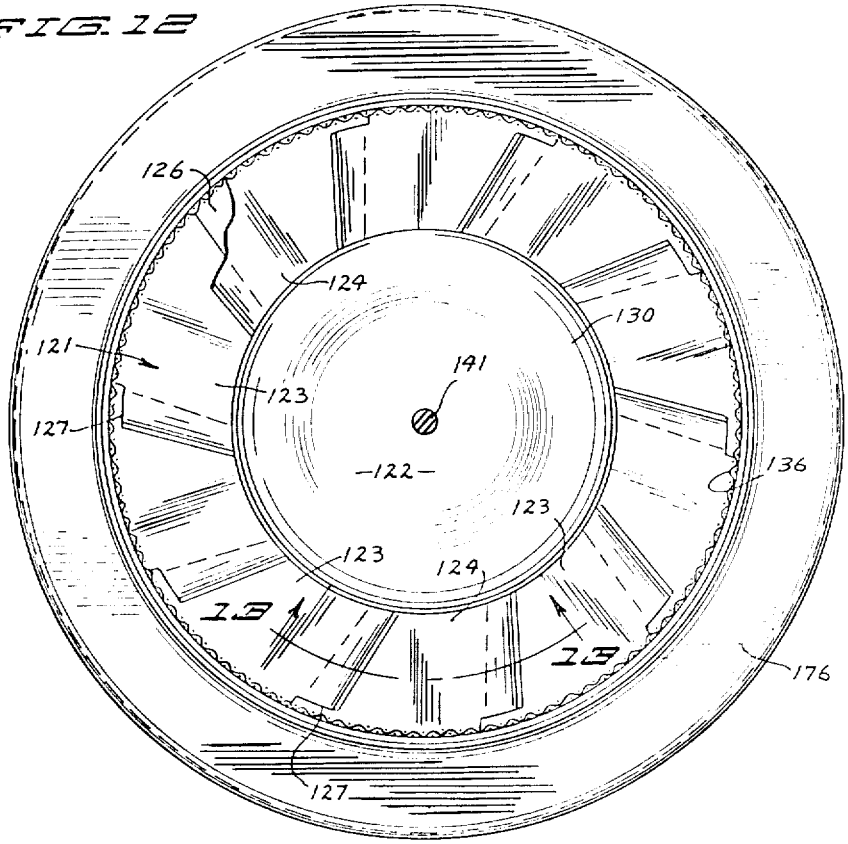
FIG. 12 is a sectional view taken along line 12—12 of FIG. 11.
Figure 13:
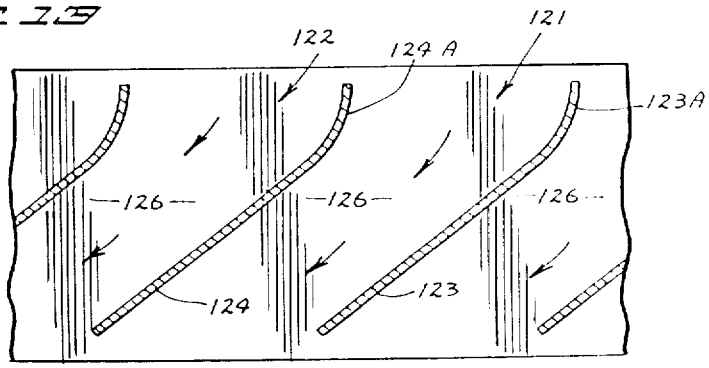
FIG. 13 is an enlarged sectional view taken along the line 13—13 of FIG. 12.

Vane assembly 121 comprises a plurality of pairs of vanes or blades 123 and 124. The vanes 123 and 124 are circumferentially spaced from each other and extend around bowl 122. Referring to FIGS. 12 and 13, each pair of vanes 123 and 124 are circumferentially spaced from each other by an inclined passage 126 which allows air to flow in a circumferential direction into chamber 119. Vanes 123 and 124 are short arcuate sheet metal segments which slope downwardly in a circumferential clockwise direction. Trailing and leading portions of each pair of vanes 123 and 124 circumferentially overlap each other so that all of the air is moved in a circumferential direction as it enters the separation chamber 119. In other words, the upper part of vane 124 is above the lower part of vane 123.

Referring to FIG. 13, the upper end section 123A of vane 123 curves in an axial or longitudinal direction. Vane 124 has a similar curved upper or inlet end section 124A. Returning to FIG. 12, the upper or inlet sections 123A and 124A of each of the pairs of vanes 123 and 124 are spaced from the adjacent inside wall 118 of the tube to form short recesses or cavities 127.

Returning to FIG. 11, bowl 122 has an upright cylindrical side wall 128 facing radially inwardly from the tube 118. A convex shaped dome 130 is integral with the upper edge of wall 128. A cup-shaped bottom wall 129 is attached to the lower end of wall 128. Bottom wall 129 has an annular outside downwardly directed lip or flange 129A that is secured by welds or the like to a lower section of wall 128.

Figure 9:
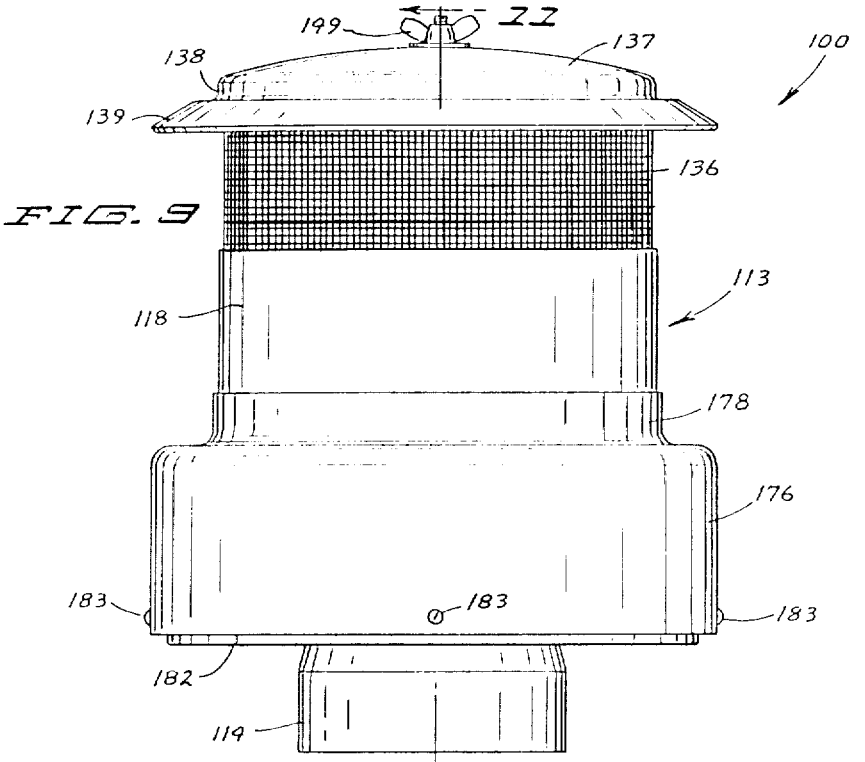
FIG. 9 is a side elevational view of a second modification of the air precleaner of the invention.
Figure 11:
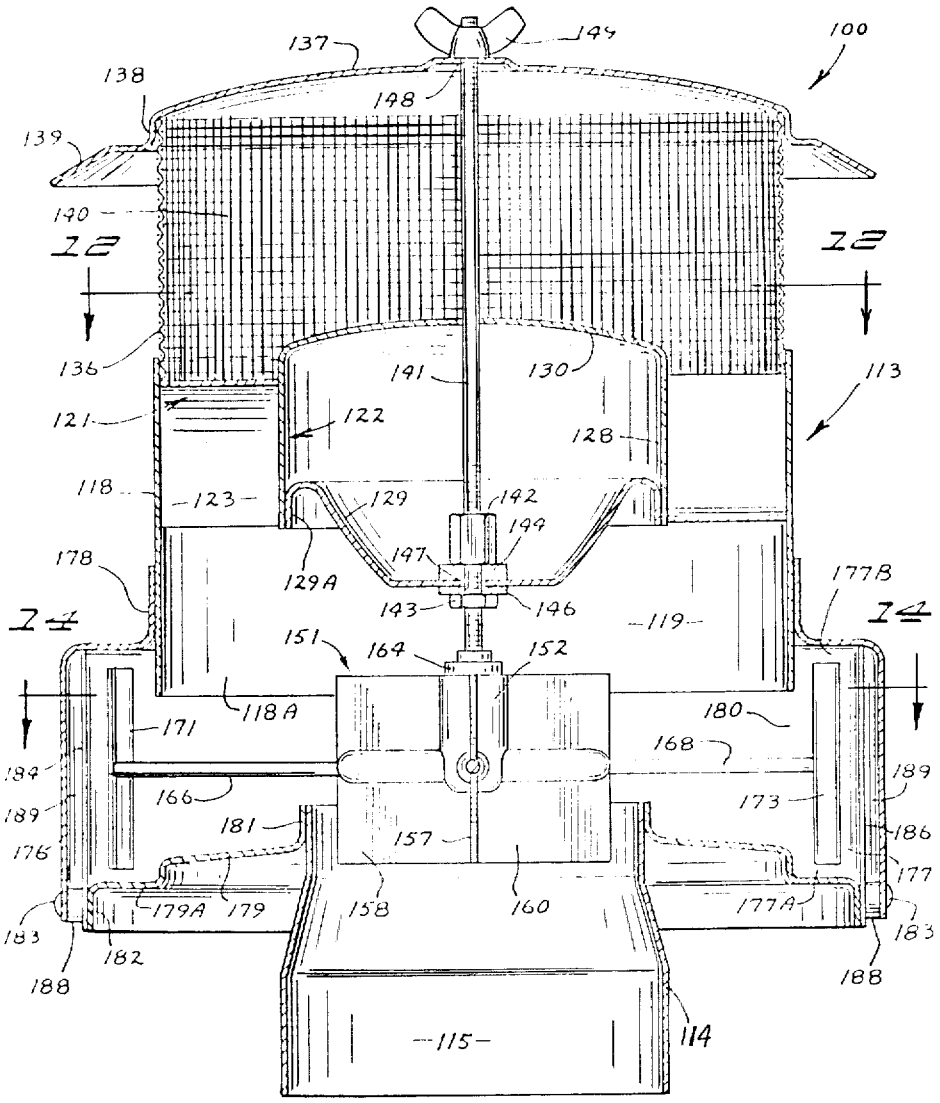
FIG. 11 is an enlarged sectional view taken along the line 11—11 of FIG. 9.

As shown in FIGS. 9 and 11, a cylindrical screen 136 extends upwardly from the top of wall 118. Screen 136 is a cylindrical screen sleeve having a lower section located within the cavities 127 formed by vanes 123 and 124 and wall 118. Screen 136 surrounds an inlet chamber 140 having an annular bottom portion open to the inlet of housing 118 or passages 126. Screen 136 is a wire mesh member, preferably having four wires per centimeter. Other size screens can be used for screen 136.

A generally flat dome cover 137 closes the top of screen 136. Cover 137 has a downwardly directed annular peripheral lip 138 located in engagement with an upper annular section of screen 136. An outwardly projected annular flange 139 is attached to the lower end of lip 138. Cover 137 forms the top wall of inlet chamber 140.

An upright rod 141 is located along the central longitudinal axis of chamber 140. Rod 141 is clamped onto the midsection of bottom wall 129 with a pair of nuts 142 and 143. Washers 144 and 146 are interposed adjacent opposite sides of wall 129. Rod 141 projects through a central hole 147 in wall 129 and extends downwardly into separation chamber 119. The upper end of rod 141 projects through a central hole 148 in cover 137. A wing nut 149 threaded onto the upper end of rod 141 holds the cover 137 in assembled relation with screen 136. Wing nut 149 can be readily removed whereby the cover can be removed from rod 141. Screen 136 can be lifted from the vane assembly 121 whereby it can be readily cleaned and replaced.

Figure 14:
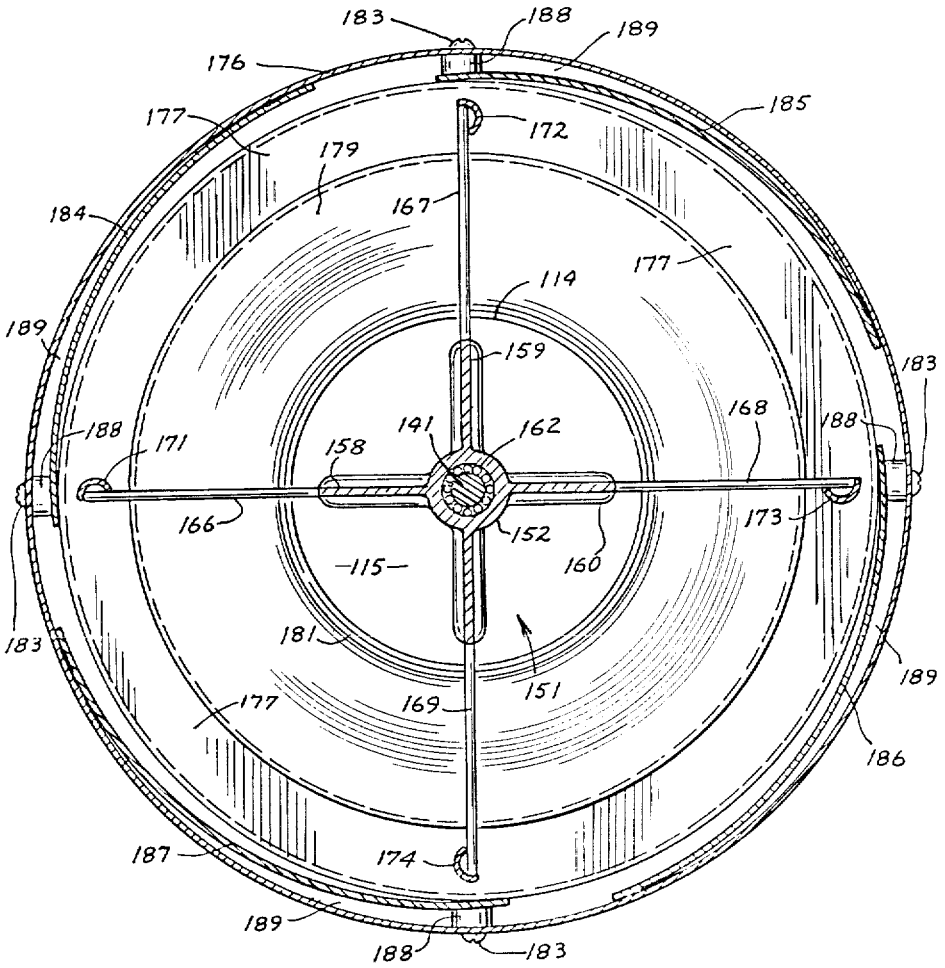
FIG. 14 is a sectional view taken along the line 14—14 of FIG. 11.

Referring to FIGS. 11 and 14, a rotatable impeller or spinner assembly, indicated generally at 151, is located below the lower end of wall 118 in the bottom part of separation chamber 119. Spinner assembly 151 has an upright cylindrical central hub 152. Four upright flat blades 157, 158, 159, and 160 are secured to and project radially outwardly from hub 152. Blades 157–160 are integral with the hub and are circumferentially spaced 90° from each other. About the lower one-third of each of the blades 157–160 project downwardly into the upper portion of passage 115. Hub 152 has a central bore accommodating a bearing assembly 162 rotatably mounting the spinner assembly 151 on the lower end of rod 141. Bearing assembly 162 can be a sleeve bearing or a roller bearing, as shown in FIG. 14. Preferably, bearing assembly 162 has a minimum of friction or resistance to rotation of spinner assembly 151. Returning to FIG. 11, a cap 164 located above hub 152 closes the top entrance into hub 152. Cap 164 can the air-pervious washer as shown in FIG. 8.

Referring to FIG. 14, a plurality of arms or rods 166, 167, 168 and 169 extend radially in an outward direction from hub 152. Rods 166–169 are located in the vertical planes of blades 157, 158, 159, and 160 respectively. Rods 166–169 located in a common horizontal plane in the lower portion of separation chamber 119. Upright paddles or impellers 171, 172, 173, and 174 are secured to the outer ends of each arm. Paddles 169–171, 172, 173, and 174 are upright convex members located in an annular exit chamber 177. The leading or forward sections of paddles 171–174 are convex in shape. Chamber 177 is surrounded by an annular skirt or sleeve 176. Sleeve 176 has an upwardly directed flange 178 secured to a lower portion of wall 118. The lower or bottom side of chamber 177 is closed with a base or dish plate 179. As shown in FIG. 11, plate 179 has a downwardly directed annular step portion 179A forming the bottom area of chamber 177. The inner portion of plate 179 has an upwardly directed annular flange 181 secured to the top of sleeve 114. The outer peripheral edge of plate 179 has a downwardly directed flange 182 located in inwardly spaced relationship relative to the lower portion of skirt 176.

Figure 10:
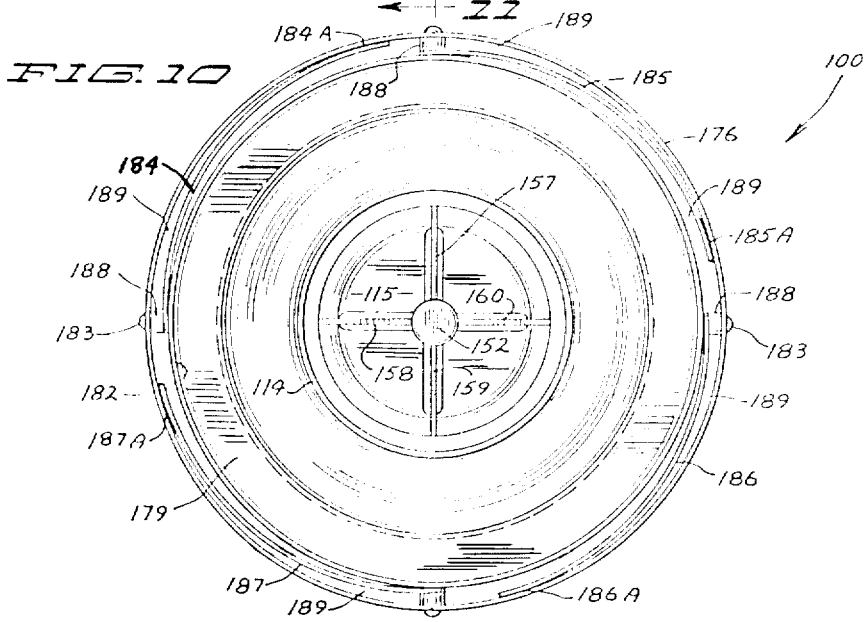
FIG. 10 is a bottom plan view of the air precleaner of FIG. 9.

A plurality of circumferentially spaced nut and bolt assemblies 183 attach the skirt 176 to outer annular flange 182. A plurality of arcuate separators or blades 184, 185, 186, and 187 are located in chamber 177 between the outer ends of paddles 171–174 and skirt 176. Blade 184 has an end 184A attached by welds or the like to the inside of skirt 176 as seen in FIG. 10. Blades 185–187 have similar ends attached to the inside of skirt 176. The opposite or forward ends of blades 184–187 are spaced inwardly from skirt 176 with washers or spacers 188 surrounding the bolts of the nut and bolt assemblies 183. As shown in FIGS. 10 and 14, blades 184–187 are spaced from each other equal circumferential distances and form a plurality of air discharge outlets 189 between skirt 176 and outside flange 182 of base 179. The forward portions or mouths of the outlet 189 are upright, elongated passages separated about 90° from each other and are located radially outwardly of paddles 171–174.

Returning to FIG. 11, the cylindrical wall or tube 118 has a lower portion or extension 118A that separates a portion of chamber 119 from the outside annular chamber 117 for paddles 171–174. Paddles 171–174 are located in an upright position generally parallel to the rotational axis of the spinner assembly 151. The lower ends of the paddles are located in a recess 177A. The upper ends of the paddles 171–174 are located in the top annular pocket or recess 177B. Recesses 177A and 177B form the top and bottom portions of the annular chamber 177. Chamber 177 is in direct communication with the separation chamber 119 via a large annular opening or passage 180 defined by the lower edge of the extension 118A and the base 179. Chamber 177 is also in communication with the outside atmosphere via the arcuate outlet passages 189 defined by the separators 184–187 and the inside of skirt 176.

Figure 15:
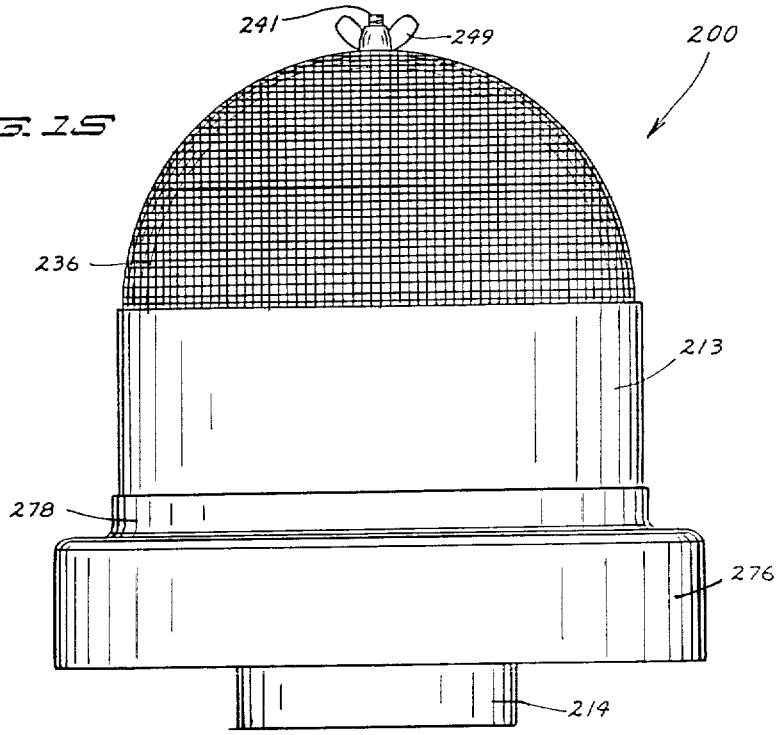
FIG. 15 is a side elevational view of a third modification of the air precleaner of the invention.
Figure 16:
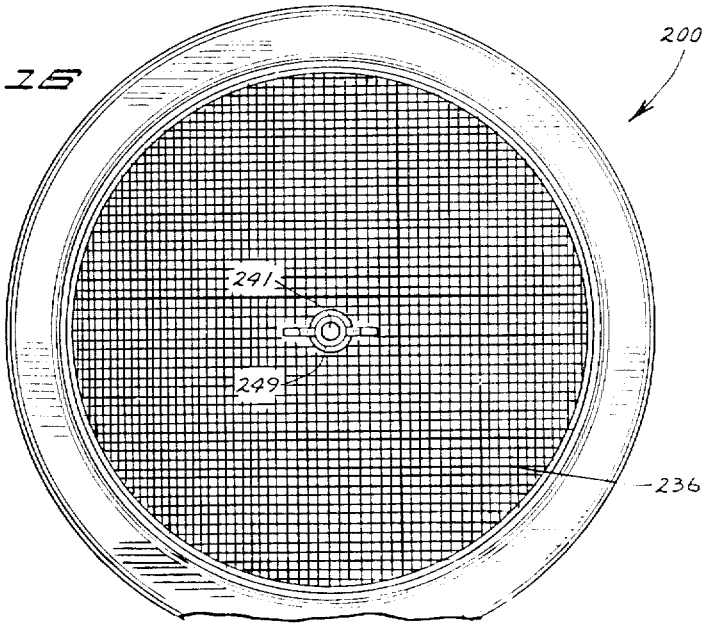
FIG. 16 is a top plan view of FIG. 15.

Referring to FIGS. 15 and 16, there is shown a third modification of the air precleaner indicated generally at 200 of the invention. Precleaner 200 has a cylindrical housing 213 carrying an annular sleeve or skirt 276. Skirt 276 has a flange 278 attached to the lower portion of housing 213. A downwardly directed outlet sleeve 214 is attached to the lower portion of housing 213. Housing 213 contains a vane assembly and a spinner assembly as shown in the precleaner of FIGS. 9–14. All of the structure shown and described relative to precleaner 100 is incorporated into precleaner 200.

The top of housing 213 is closed with a dome shape or hemispherical shaped screen 236. An upright rod 241 extends through the top of screen 236 and carries a wing nut 249. Nut 249 holds the screen 236 in assembled relation with the top of housing 213.

Precleaner 200 is used in locations where it is not necessary to have a solid cover or roof structure for the precleaner. For example, precleaner 200 can be used under a vehicle hood and located in a horizontal position. Wing nut 249 can be removed and the screen 236 pulled from the rod 241 so that it can be readily cleaned, repaired or replaced.

Referring to FIGS. 17–22, there is shown a fourth modification of the air precleaner of the invention indicated generally at 300. Precleaner 300 has an upright housing 313 having a centrally located downwardly directed outlet sleeve 314. Sleeve 314 is adapted to be mounted on the inlet end of a pipe or stack for delivering clean air to the air intake structure of an internal combustion engine. Sleeve 314 has a passage 315 open to the interior of the precleaner.

Figure 19:
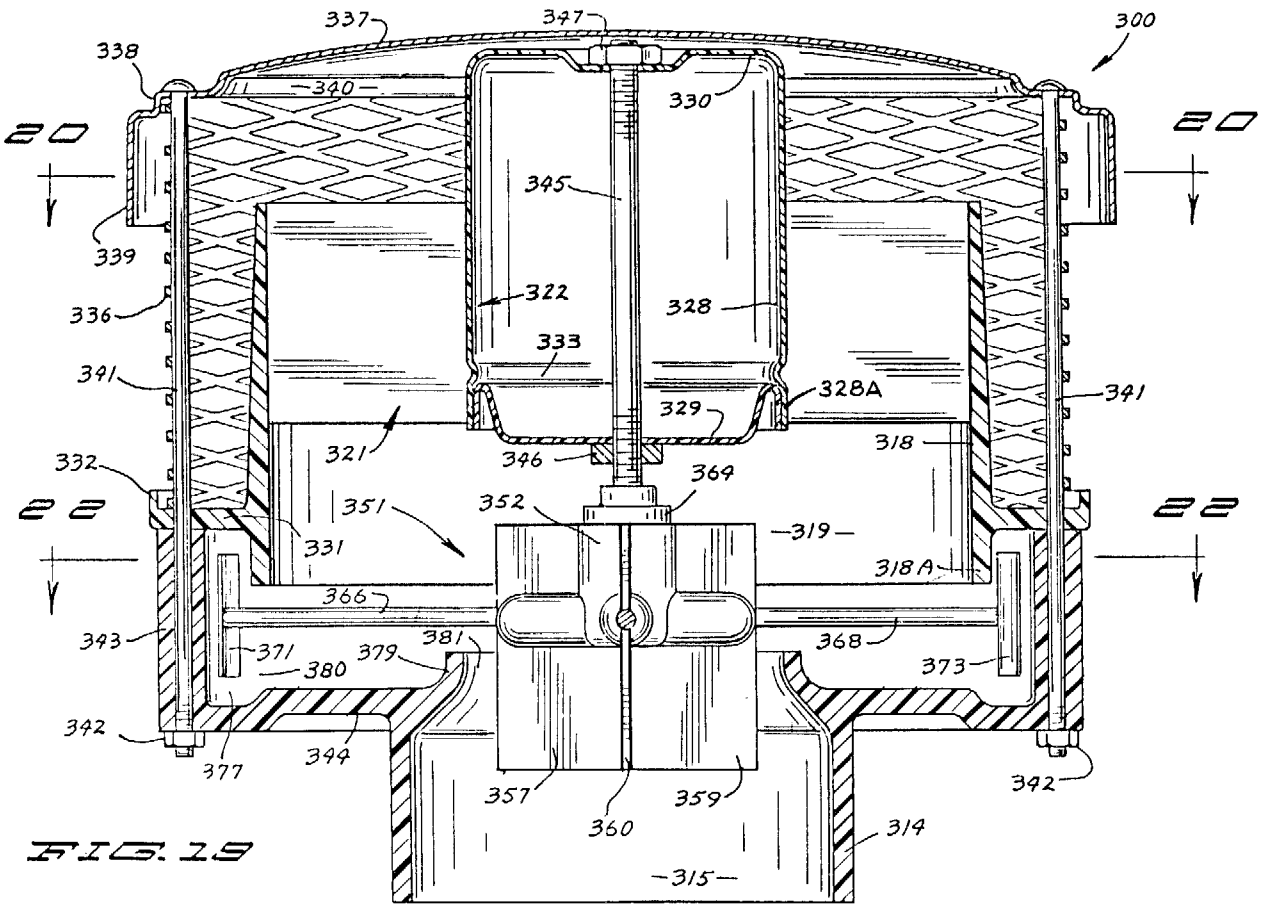
FIG. 19 is an enlarged sectional view taken along the line 19—19 of FIG. 17.
Figure 20:
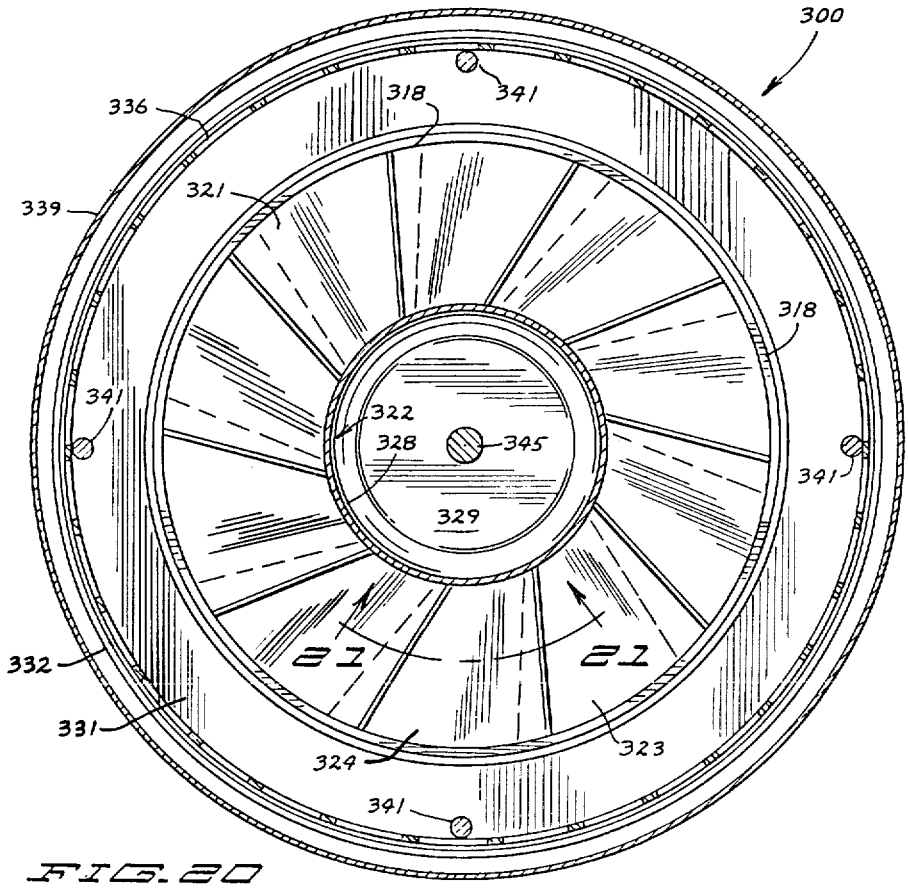
FIG. 20 is a sectional view taken along line 20—20 of FIG. 19.

Referring to FIG. 19, precleaner 300 has an upright tube or cylindrical member 318 surrounding a particle separation chamber 319. A vane assembly indicated generally at 321 is located in the upper portion of separation chamber 319. Vane assembly 321 surrounds a central bowl or center member 322 which provides a support for a spinner assembly 351. Vane assembly 321 comprises pairs of circumferentially oriented vanes 323 and 324. The pairs of vanes are spaced from each other to form inclined circumferentially directed passages 326.

Figure 21:
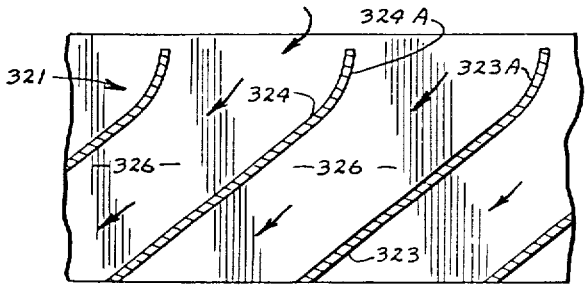
FIG. 21 is an enlarged sectional view taken along the line 21—21 of FIG. 20.

As shown in FIG. 21, the upper or inlet ends of each vane has a forward or axially curved end 323A and 324A for directing air into the passages 326. Air and entrained particles flow through the passages 326 and are directed into the separation chamber in a circumferential direction such that the centrifugal forces acting on the particles move the particles outwardly toward the annular wall 318.

Referring to FIG. 19, bowl 322 has an upright cylindrical wall 328 having a downwardly projecting flange 328A secured to a cup-shaped bottom wall 329. The top wall 330 is integral with the top of wall 328.

The lower portion of wall 318 has an outwardly directed annular flange 331 terminating in an upwardly directed annular lip 332. Bowl 328, flange 328A, and top wall 330, as well as vane assembly 321, member 318, flange 331, and lip 332, are formed from a single piece of material such as plastic. The cup shaped bottom wall 329 is a separate piece that fits into the bottom portion of the cylindrical wall 328.

An annular cylindrical open member 336 such as a screen or expanded metal surrounds the cylindrical wall 318 and rests on the flange 331. A dome-shaped cover 337 rests on the top of screen 336. Cover 337 has an outer downwardly directed lip 338 terminating in an annular flange 339. Cover 337 closes the top of an inlet chamber 340 in communication with the top of vane assembly 321. A plurality of circumferentially located bolts 341 extend through suitable holes in the cover 337, holes in flange 331 and aligned holes in outside wall 343 of base member 344. Nuts 342 threaded onto the lower end of bolts 341 secure the cover to the top of screen 336 and hold the base 344 in assembled relation with flange 331.

An upright threaded rod 345 is located along the central longitudinal axis of the precleaner. Rod 345 extends through the bowl 322 and is mounted thereon with a pair of nuts 346 and 347. Nut 346 engages the bottom wall 329 holding the wall 329 in assembled relation with the wall 328. Nut 347 is threaded on the top of rod 345 and engages the top wall 330.

Figure 22:
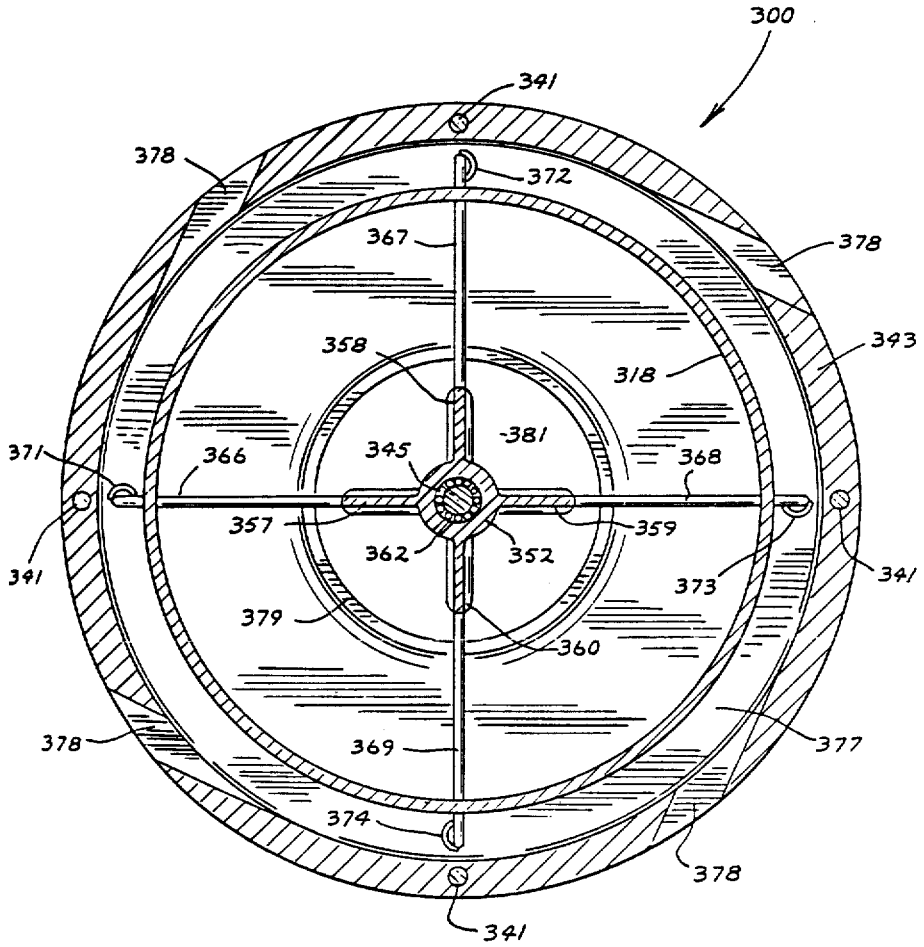
FIG. 22 is a sectional view taken along the line 22—22 of FIG. 19.

The spinner assembly indicated generally at 351 is located below bowl 322 in the separation chamber 319. Spinner assembly is the central upright hub 352 carrying four circumferentially spaced flat blades 357, 358, 359, and 360. As shown in FIG. 22, hub 352 carries a bearing 362 to rotatably mount the hub on the rod 345. A cap 364, shown in FIG. 19, surrounds the rod 345 and is located adjacent the top of hub 352 to prevent foreign materials from interfering with the operation of the bearing 362.

Referring to FIG. 22, four radially directed arms 366, 367, 368, and 369 are mounted on the blades 357–360 respectively. The arms 366–369 have outer ends that terminate adjacent the inside of wall 343. Upright blades or paddles 371, 372, 373, and 374 are secured to the outer ends of the arms 366, 367, 368, and 369 respectively. Paddles 371–374 are upright curved impellers having a leading or forward convex surface. Wall 343 is located outwardly of downward extension 318A of wall 318 and provides an annular exit chamber 377 for providing a circular path or space for the paddles 371–374.

Figure 17:
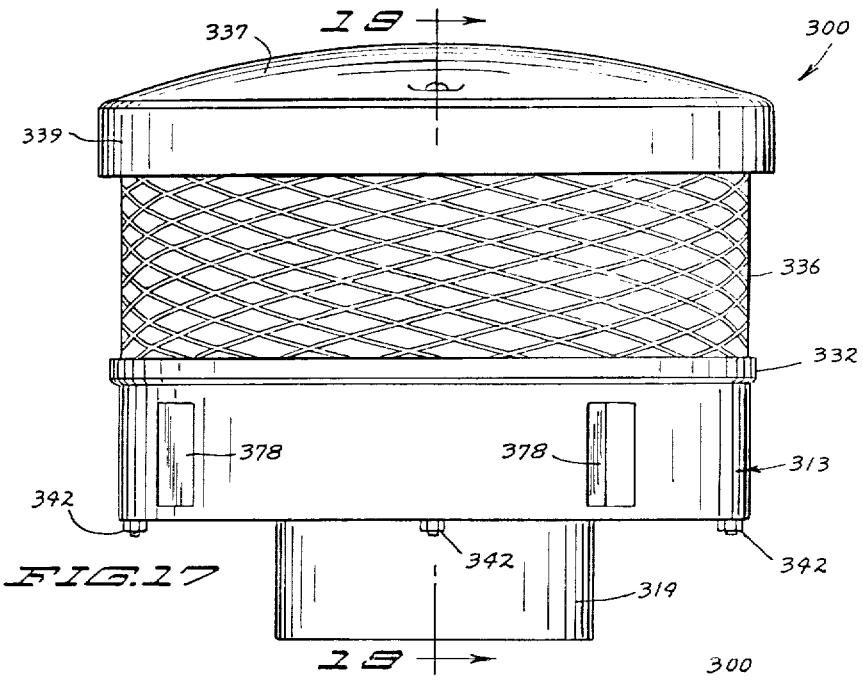
FIG. 17 is a side elevational view of a fourth modification of the air precleaner of the invention.
Figure 18:
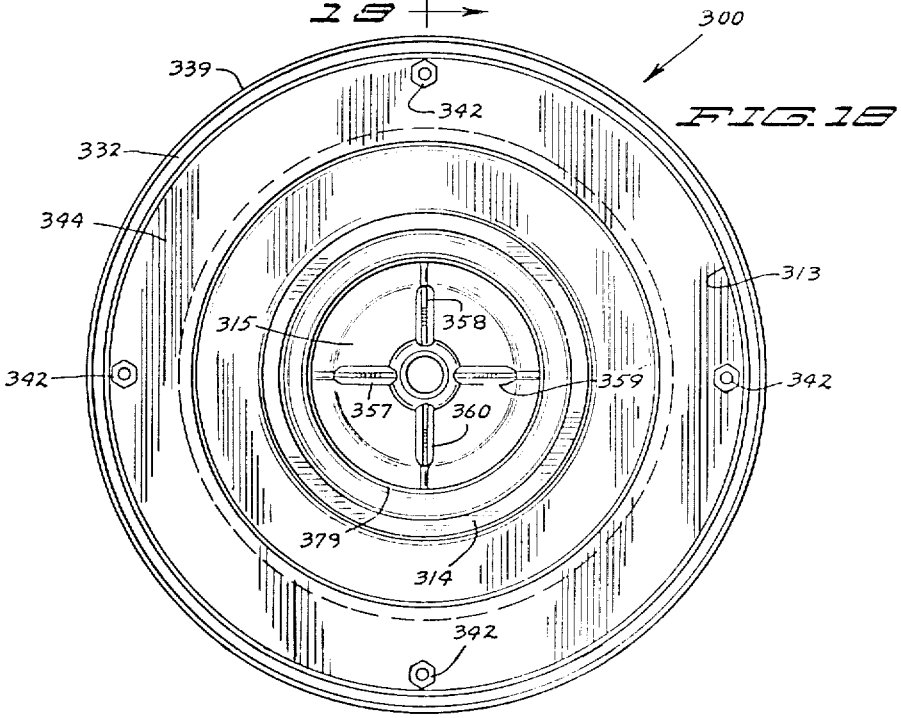
FIG. 18 is a bottom plan view of the air precleaner of FIG. 17.

Referring to FIGS. 17 and 22, wall 343 has a plurality of tangential exit openings 378 in communication with the chamber 377 and the outside atmosphere. Impellers 371–374 are moved with spinner assembly 351 to pump or force air and particulates out through openings 378.

Returning to FIG. 19, blades 357–360 extend downwardly into passage 315. The central portion of base 344 has a neck 379 having a throat 381 of a diameter smaller than the diameter of the passage 315. Blades 357–360 extend through throat 381 and into passage 315.

In use, the air and particulates entrained in the air move through the screen 336 into the inlet chamber 340. The large particulate matter is separated from the air by the screen 336. The air moves through the vane assembly 321. The passages 326 of the vane assembly 321 being inclined direct the air in a circumferential direction into separation chamber 319. The circumferentially moving air then carries the particulates in an outer zone adjacent the cylindrical wall 318. The particulates and air adjacent the wall 318 move downwardly toward the annular chamber 377. The particulates being heavier than the air move through annular opening 380 into the chamber 377 and are dispelled from the chamber 377 through the outlet openings 378 by the rapidly moving impellers 371–374. The spinner assembly 351 is rotated by the air moving into the passage 315. The blades 357–360 being located in the inlet end of passage 315 are moved in a circumferential direction by the vortexual flow of the clean air as it moves through throat 381. Throat 381 being a restricted air passage increases the velocity of the air moving through the passage. This facilitates the rapid rotation of the spinner assembly 351. The clean air moves down the passage to means to utilize the clean air, as an internal combustion engine.

While there has been shown and described several embodiments of the invention, it will be apparent to those skilled in the art that changes in size, materials and structure may be made without departing from the scope and spirit of the invention.

The embodiments of the invention in which an exclusive property or privilege is claimed are defined as follows:

1. An apparatus for separating particles from gas carrying the particles comprising: a housing having a separation chamber, said housing having a first wall member surrounding said chamber, a bowl-shaped member disposed centrally of said chamber, a vane assembly disposed between said members and having a plurality of vanes, said vanes being generally similarly inclined and circumferentially spaced from each other forming passages so as to induce swirling motion of gas and particles in a circular direction passing therethrough whereby the particles move outwardly by centrifugal force, said vane assembly being connected to said first wall member and bowl-shaped member to support said bowl-shaped member on said housing, a second wall member spaced from said first wall member and mounted on said bowl-shaped member adjacent [the] *a* gas inlet side of said vane assembly, said second wall member having a concavely curved wall for directing gas and particles toward said vane assembly with said curved wall having an end terminating in spaced relation to said first wall member to define a gas and particle entrance, a cover mounted on said second wall member at said end thereof, means holding said cover on said second wall member and said second wall member on said bowl-shaped member, screen means extending between said cover and said first wall member at said entrance for separating large particles from the gas passing therethrough, an annular skirt attached to said first wall member adjacent said separation chamber and spaced outwardly therefrom to define therein an annular discharge chamber communicating with said separation chamber, a bottom wall attached to said skirt extending inwardly therefrom in spaced relation thereto thereby to define discharge openings for movement of gas and particles from said discharge chamber, a gas outlet sleeve disposed centrally of said bottom wall and extending therethrough communicating with said separation chamber and defining a gas outlet passage therefrom, spinner means, means mounting said spinner means on the bowl-shaped member for free rotation in said separation chamber, said spinner means including propeller means having at least a part thereof disposed in said gas outlet passage whereby swirling gas in said separation chamber and gas outlet passage contacts said propeller means and solely effects rotation thereof, said spinner means further including outwardly extending arms connected to said propeller means and terminating in impeller paddles located in said discharge chamber, whereby rotation of said propeller means causes said paddles to rotate in said discharge chamber and force particles and gas therefrom and through said discharge openings.

2. The apparatus of claim 1 wherein: the bowl-shaped member has a cylindrical side wall and a convex-shaped wall attached to the side wall.

3. The apparatus of claim 2 wherein: said holding means includes a rod mounted on the central portion of the convex-shaped wall, means attachable to the rod to hold the cover on the second wall member, said means rotatably mounting the spinner means on the bowl-shaped member including a part of said rod and bearing means mounted on said rod.

4. The apparatus of claim 1 wherein: the first wall member has a cylindrical portion separating a part of the separation chamber from the discharge chamber.

5. The apparatus of claim 4 wherein: the gas outlet sleeve has a cylindrical portion projected axially into the separation chamber.

6. The apparatus of claim 1 wherein: the gas outlet sleeve has a cylindrical portion projected axially into the separation chamber.

7. The apparatus of claim 1 wherein: the propeller means, arms, and paddles are in general transverse alignment.

8. The apparatus of claim 1 wherein: the second wall member has an annular flange, and said cover has an annular lip spaced from and surrounding the annular flange, said screen means having a circular section located between the lip and annular flange.

9. The apparatus of claim 1 wherein: the propeller means comprises a plurality of generally flat blades, each blade extended axially into the gas outlet passage of the gas outlet sleeve.

10. The apparatus of claim 1 wherein: the means rotatably mounting the spinner means on the bowl-shaped member includes a rod, bearing means mounted on the rod, a tubular hub mounted on the bearing means, said propeller means being attached to the hub, a first washer surrounding the rod and located above the hub, and a second washer engageable with the first washer to force the first washer toward the hub.

11. The apparatus of claim 1 wherein: the first wall member has a cylindrical lower end portion and the bottom wall has an annular portion separated from said end portion to form an annular passage between the separation chamber and the discharge chamber.

12. The apparatus of claim 1 including: a plurality of separate blades secured to the skirt and forming with the bottom wall said discharge openings.

13. The apparatus of claim 12 wherein: the skirt is defined by an annular wall, and each blade is an arcuate plate having one end secured to the inside surface of the annular wall and the opposite end spaced from the inside surface of the annular wall, said opposite end forming with the inside surface an elongated upright opening, said opening being in communication with the discharge chamber.

14. An apparatus for separating particles from gas carrying the particles comprising: a housing having a separation chamber, said housing having a side wall surrounding said chamber and an adjacent gas and particle inlet opening, and a member disposed centrally of said chamber, vane means extending between [said] *and* connected to said side wall and said member, said vane means having a plurality of vanes, said vanes being generally similarly inclined and circumferentially spaced from each other forming passages so as to induce swirling motion of gas and particles in a circular direction passing therethrough whereby the particles move outwardly by centrifugal force, annular skirt means *having a substantially right cylindrical configuration, said skirt means being* attached to said side wall adjacent said separation chamber and spaced radially outwardly therefrom to define therein a discharge chamber radially outwardly of said separation chamber, an annular opening connecting the separation chamber and the discharge chamber, said housing including a wall attached to said skirt means extending inwardly therefrom in spaced relation thereto thereby to define discharge openings for gas and particles from said discharge chamber, a gas outlet sleeve disposed centrally of said wall extending inwardly from said skirt means and extending therethrough communicating with said separation chamber and defining a gas outlet passage therefrom, spinner means, means mounting said spinner means on the housing for free rotation in said separation chamber, said spinner means including propeller means adjacent said gas outlet passage whereby swirling gas in said separation chamber contacts said propeller means and solely effects rotation thereof, said spinner means further including outwardly extending arm means connected to said propeller means terminating in impeller paddles located in said discharge chamber, whereby rotation of said propeller means causes said paddles to rotate through said discharge chamber and force particles and [air] *gas* therefrom and through said discharge openings.

15. The apparatus of claim 14 wherein: the side wall of the housing is a cylindrical member having a first portion and a second portion, said vane means being mounted on the first portion of the cylindrical member so that the gas and particles are directed into the separation chamber, and said skirt means is secured to the cylindrical member *second portion* to locate the wall extending inwardly from said skirt means in spaced relation to the vane means.

16. The apparatus of claim 14 including: a plurality of separated blades secured to the skirt means and forming with the wall extending inwardly from the skirt means the discharge openings.

17. The apparatus of claim 16 wherein: the skirt means is defined by a wall and each blade is an arcuate plate having one end secured to the wall defining the skirt means and the opposite end spaced from the wall defining the skirt means, said opposite end forming with the wall defining the skirt means an elongated upright opening.

18. The apparatus of claim 14 wherein: the side wall of the housing is a cylindrical member and the skirt means is an annular sleeve surrounding and secured to the cylindrical member, said opening connecting the separation chamber and discharge chamber being an annular passage located between the cylindrical member and the wall extending inwardly from the skirt means.

19. The apparatus of claim 14 wherein: the means rotatably mounting the spinner means includes a rod mounted on the member, a bearing assembly rotatably mounted on the rod and secured to the spinner means.

20. The apparatus of claim 19 wherein: the bearing assembly includes a tubular hub having an upper open end located around the rod, bearing means rotatably mounting the hub on the rod, a felt washer closing the upper end of the tubular hub, and weight means acting on the felt washer to hold the felt washer in its closed position relative to the hub.

21. The apparatus of claim 20 wherein: the member is a bowl-shaped member having a wall, and means mounting the rod to said wall of the bowl-shaped member.

22. The apparatus of claim 21 including: stack means mounted on the bowl-shaped member and being associated with said side wall so as to define said inlet opening, and screen means surrounding the stack means and covering said inlet opening to separate large particles from the [air] *gas* moving toward the vane means.

23. The apparatus of claim [21] *22* including: a cover mounted on the stack means, said rod extended through the stack means and attachable to the cover to hold the cover on the stack means.

24. The apparatus of claim 22 including: a cover mounted on the stack means, said cover having a lip surrounding a portion of the screen means.

25. The apparatus of claim 14 wherein: the member has a side wall secured to the vane means and a bottom wall attached to the side wall.

26. The apparatus of claim 25 wherein: the means rotatably mounting the spinner means includes a rod mounted on the bottom wall, and a bearing assembly rotatably mounted on the rod and secured to the arm means.

27. The apparatus of claim 14 including: cylindrical screen means mounted on the vane means, a cover closing the top end of the cylindrical screen means, and means connecting the cover to the member.

28. The apparatus of claim 27 wherein: the means rotatably mounting the spinner means includes a rod mounted on the member, said rod carrying a threaded member engageable with the cover whereby the rod and threaded member comprise the means connecting the cover to the center member.

29. The apparatus of claim 14 including: a dome-shaped screen means mounted on the vane means covering the inlet opening, and means connecting the screen means to the member.

30. An apparatus for separating particles from gas carrying the particles comprising: a housing having a separation chamber, said housing having a side wall member surrounding said chamber and an adjacent gas and particle inlet opening, said side wall *member* having upper and lower portions, inclined vane means attached to said upper portion forming passages for inducing swirling motion of gas and particles in a circular direction passing therethrough and into said separation chamber whereby the particles move outwardly by centrifugal force, annular skirt means *having a substantially right cylindrical configuration, said skirt means being* attached to said side wall *member* lower portion adjacent said separation chamber and spaced outwardly therefrom to define therein an annular discharge chamber communicating with said separation chamber, a bottom wall attached to said skirt means extending inwardly therefrom in spaced relation thereto thereby to define discharge openings for accommodating the flow of gas and particles from said discharge chamber, gas outlet passage means mounted on said bottom wall and extending therethrough communicating with said separation chamber, spinner means, means mounting said spinner means in association with the housing for free rotation in said separation chamber, said spinner means including means located adjacent said gas outlet passage means whereby swirling gas in said separation chamber and gas outlet passage means solely effects rotation thereof, said spinner means further including paddles located in said discharge chamber, whereby rotation of said spinner means causes said paddles to rotate in said discharge chamber and force particles and gas therefrom and through said discharge openings.

31. The apparatus of claim 30 including: a plurality of separate blades secured to the skirt means and forming with the skirt means discharge passages leading to the discharge openings.

32. The apparatus of claim 31 wherein: the skirt means is defined by a wall, and each blade is an arcuate plate having one end secured to the wall defining the skirt means and the opposite end spaced from the wall defining the skirt means, said opposite end forming with the wall defining the skirt means an elongated upright opening.

33. The apparatus of claim 32 wherein: the side wall member of the housing is a cylindrical member and the skirt means is an annular sleeve surrounding and secured to the cylindrical member, and an annular passage located between the cylindrical member and the bottom wall providing gas and particle flow communication between the separation chamber and discharge chamber.

34. The apparatus of claim 33 wherein: the cylindrical member has a cylindrical extension directed toward the bottom wall and forming with the bottom wall an annular passage connecting the chambers.

35. The apparatus of claim 30 including: wall means secured to the vane means and spaced inwardly of the side wall member within the separation chamber, and wherein the means rotatably mounting the spinner means is secured to the wall means.

36. The apparatus of claim 35 wherein: the wall means has a bottom wall, said means rotably mounting the spinner means including a rod secured to the bottom wall and bearing means rotatably mounted on the rod and secured to the spinner means.

37. The apparatus of claim 36 wherein: the bearing means includes a tubular hub having an open end located around the rod, bearing members rotatably mounting the hub on the rod, a felt washer closing the open end of the tubular hub, and weight means acting on the felt washer to hold the felt washer in its closed position relative to the hub.

38. An apparatus for separating particles from gas carrying the particles comprising: a housing having a separation chamber, said housing having an inside wall surface surrounding said chamber and an adjacent gas and particle inlet opening, vane means mounted on said wall surface at the inlet opening and having a plurality of vanes, said vanes being generally similarly inclined so as to induce swirling motion of gas and particles carried thereby in a circular direction into said separation chamber whereby the particles move outwardly by centrifugal force, means attached to said housing adjacent said separation chamber and having portions spaced outwardly therefrom to define an annular discharge chamber, *having a substantially right cylindrical configuration, which is located radially outwardly of and* in communication with said separation chamber, said discharge chamber having discharge openings for gas and particles, *said means attached to said housing also including a wall extending inwardly from said discharge chamber to a* means defining a clean gas outlet passage disposed centrally of said means attached to said housing and extending therethrough communicating with said separation chamber, spinner means, means mounting said spinner means in association with the housing for free rotation in said separation chamber, said spinner means including means adjacent said gas outlet passage whereby swirling [air] *gas* in said separation chamber and gas outlet passage solely effects rotation thereof, said spinner means further including members terminating in paddles located in said discharge chamber whereby rotation of said spinner means causes said paddles to rotate in said discharge chamber and force particles and gas therefrom and outwardly through said discharge openings.

39. The apparatus of claim 38 wherein: said housing has an upright cylindrical member defining said inside wall surface and an outwardly directed flange secured to said cylindrical member, said means defining the discharge chamber having an outside cylindrical wall engageable with said flange and means securing said outside wall to said flange.

40. The apparatus of claim 39 including: a cylindrical open member surrounding the cylindrical member of the housing and engageable with said flange, a cover located over the open member and wherein said means securing said outside wall to said flange also attaches said cover to said flange thereby holding the cover on the open member.

41. The apparatus of claim 38 wherein: said means adjacent the gas outlet passage includes propeller means extended into the outlet passage and said members are outwardly directed arms connected to the propeller means, said paddles being connected to the outer ends of said arms.

42. The apparatus of claim 38 wherein: said inside wall surface has a cylindrical extension defining with said means defining the discharge chamber an annular passage between the separation chamber and the discharge chamber.

43. The apparatus of claim 38 wherein: the means adjacent the outlet passage includes propeller means extended into the outlet passage, said propeller means including a plurality of generally flat blades, each blade having a portion thereof extended axially into said outlet passage.

44. The apparatus of claim 38 including: a center member surrounded by and secured to the vane means, and wherein the means rotatably mounting the spinner means is secured to the center member.

45. The apparatus of claim 44 wherein: the means rotatably mounting the spinner means includes a rod mounted on the center member and a bearing assembly rotatably mounted on the rod and secured to the spinner means.

46. The apparatus of claim 38 including: a center member having an upright wall surrounded by and secured to the vane means and a bottom wall attached to the upright wall, and wherein the means rotatably mounting the spinner means is secured to said center member.

47. The apparatus of claim 38 wherein: said means attached to said housing adjacent said separation chamber includes an annular skirt and a bottom wall attached to said skirt.

*48. The apparatus of claim 38 wherein: said housing is upright and said vane means is located above said discharge chamber and said clean gas outlet passage, whereby the gas and particles carried into said separation chamber move circumferentially and axially therethrough with a portion of the gas and particles moving axially outwardly and downwardly along said inside wall surface into said discharge chamber where the particles and gas are forced outwardly through said discharge openings by said paddles, and with another portion of the gas moving axially inwardly and downwardly to flow out through said gas outlet passage while engaging and rotating said spinner means adjacent thereto.*

*49. An apparatus for separating particles from gas carrying the particles comprising: an upright housing having a separation chamber, said housing having an inside wall surface surrounding said chamber and an adjacent gas and particle inlet opening, vane means mounted on said wall surface at the inlet opening and having a plurality of vanes, said vanes being generally similarly inclined so as to induce swirling motion of gas and particles carried thereby in a circular direction into said separation chamber whereby the particles move outwardly by centrifugal force, means attached to said housing adjacent said separation chamber including an elongated skirt having a substantially right cylindrical configuration which is located radially outwardly from said housing to define an annular discharge chamber in communication with said separation chamber, said discharge chamber having discharge openings for gas and particles, said means attached to said housing also including a wall extending inwardly from said discharge chamber to a means defining a clean gas outlet passage disposed centrally of said means attached to said housing and extending therethrough communicating with said separation chamber, spinner means, means mounting said spinner means in association with the housing for free rotation in said separation chamber, said spinner means including means adjacent said gas outlet passage whereby swirling gas in said separation chamber and gas outlet passage solely effects rotation thereof, said spinner means further including members terminating in paddles located in said discharge chamber whereby rotation of said spinner means causes said paddles to rotate in said discharge chamber and force particles and gas therefrom and outwardly through said discharge openings, said vane means being located above said discharge chamber and said clean gas outlet passage, whereby the gas and particles carried into said separation chamber move circumferentially and axially therethrough with a portion of the gas and particles moving axially outwardly and downwardly along said inside wall surface into said discharge chamber where the particles and gas are forced outwardly through said discharge openings by said paddles, and with another portion of the gas moving axially inwardly and downwardly to flow out through said gas outlet passage while engaging and rotating said spinner means adjacent thereto.*

* * * * *